US008938443B2

(12) United States Patent
Etzion et al.

(10) Patent No.: US 8,938,443 B2
(45) Date of Patent: Jan. 20, 2015

(54) RUNTIME OPTIMIZATION OF SPATIOTEMPORAL EVENTS PROCESSING

(75) Inventors: Opher Etzion, Haifa (IL); Nir Zolotorevsky, Kiriat Bialik (IL)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/907,048

(22) Filed: Oct. 19, 2010

(65) Prior Publication Data

US 2012/0095986 A1    Apr. 19, 2012

(51) Int. Cl.
*G06F 17/30*    (2006.01)
*G06F 9/54*    (2006.01)

(52) U.S. Cl.
CPC .......... *G06F 17/30241* (2013.01); *G06F 9/542* (2013.01)
USPC .......................................... 707/713; 707/724

(58) Field of Classification Search
USPC ........................... 707/713, 724, 743, 787, 788
See application file for complete search history.

(56) References Cited

U.S. PATENT DOCUMENTS

| 5,644,740 | A  | * | 7/1997 | Kiuchi ........................... 715/853 |
| 5,742,283 | A  | * | 4/1998 | Kim ............................... 715/201 |
| 6,836,894 | B1 | * | 12/2004 | Hellerstein et al. ............ 719/318 |
| 7,136,791 | B2 | * | 11/2006 | Darwent et al. .................. 703/6 |
| 7,545,954 | B2 |   | 6/2009 | Chan et al. |
| 7,555,476 | B2 | * | 6/2009 | Holbrook ............... 707/999.003 |
| 7,769,745 | B2 | * | 8/2010 | Naaman et al. ............... 707/713 |
| 8,069,142 | B2 | * | 11/2011 | Davis et al. .................... 707/610 |
| 8,166,168 | B2 | * | 4/2012 | Hayashi et al. ................ 709/226 |
| 8,510,291 | B2 | * | 8/2013 | Cole et al. ...................... 707/714 |
| 2003/0014286 | A1 | * | 1/2003 | Cappellini ......................... 705/5 |
| 2003/0200192 | A1 |   | 10/2003 | Bell et al. |
| 2004/0128624 | A1 | * | 7/2004 | Arellano et al. .............. 715/530 |
| 2004/0268314 | A1 |   | 12/2004 | Kollman et al. |
| 2007/0132767 | A1 | * | 6/2007 | Wright et al. .................. 345/475 |
| 2008/0016048 | A1 | * | 1/2008 | Dettinger et al. ...... 707/999.004 |
| 2008/0301125 | A1 | * | 12/2008 | Alves et al. ........................ 707/5 |
| 2009/0070313 | A1 | * | 3/2009 | Beyer et al. ....................... 707/5 |
| 2009/0177391 | A1 |   | 7/2009 | Yakali |
| 2009/0282056 | A1 | * | 11/2009 | Patel et al. ..................... 707/100 |
| 2010/0125584 | A1 | * | 5/2010 | Navas ........................... 707/747 |

FOREIGN PATENT DOCUMENTS

EP    1954004    8/2008

* cited by examiner

*Primary Examiner* — Cam-Y Truong

(57) ABSTRACT

A method of optimizing runtime spatiotemporal events processing is provided. The method includes the following stages: defining a plurality of spatial contexts or spatiotemporal contexts; specifying a plurality of spatial patterns or spatiotemporal patterns being relationships between events complying with specified policies within the defined spatial contexts and spatiotemporal contexts respectively; identifying events of specified properties out of a stream of incoming events, based on the defined spatial contexts or the defined spatiotemporal contexts; detecting event patterns of specified properties out of the stream of incoming events by grouping the incoming events and applying a pattern matching process based on the specified spatial patterns or spatiotemporal patterns; adaptively generating a spatial evaluation plan that defines an order of processing such that event processing is optimized, based on off-line and runtime data; and processing the incoming events based on the order defined in the spatial evaluation plan.

18 Claims, 9 Drawing Sheets

| | | 410 |
|---|---|---|
| MIN DISTANCE | A BINARY OPERATOR (>,<=,,,) THAT REFERS TO THE MINIMAL DISTANCE AN EVENT, THAT BELONGS TO A SET OF EVENTS, TO CERTAIN OBJECT | |
| MAX DISTANCE | A BINARY OPERATOR (>,<=,,,) THAT REFERS TO THE MINIMAL DISTANCE AN EVENT, THAT BELONGS TO A SET OF EVENTS, TO CERTAIN OBJECT | |
| AVERAGE DISTANCE | A BINARY OPERATOR (>,<=,,,) THAT REFERS TO THE MINIMAL DISTANCE AN EVENT, THAT BELONGS TO A SET OF EVENTS, TO CERTAIN OBJECT | |
| RELATIVE MIN DISTANCE | A BINARY OPERATOR (>,<=,,,) THAT REFERS TO THE MINIMAL DISTANCE BETWEEN TWO EVENTS FOR A SET OF EVENTS. | |
| RELATIVE MAX DISTANCE | A BINARY OPERATOR (>,<=,,,) THAT REFERS TO THE MINIMAL DISTANCE BETWEEN TWO EVENTS FOR A SET OF EVENTS. | |
| RELATIVE AVERAGE DISTANCE | A BINARY OPERATOR (>,<=,,,) THAT REFERS TO THE MINIMAL DISTANCE BETWEEN TWO EVENTS FOR A SET OF EVENTS. | |

Figure 4A

| | | 420 |
|---|---|---|
| MOVING IN CONSISTENT DIRECTION | A TIME SERIES OF EVENTS INDICATE THAT THERE IS MOVEMENT IN DIRECTIONS OF - N,NE,E,SE,S,SW,W,NW. | |
| MOVING IN MIX DIRECTION | A TIME SERIES OF EVENTS INDICATE THAT THERE IS NO MOVEMENT IN ANY CONSISTENT DIRECTIONS | |
| STATIONARY | A TIME SERIES OF EVENTS INDICATE THAT THERE IS NO MOVEMENT | |
| MOVING TOWARDS | A TIME SERIES OF EVENTS INDICATE THAT THERE IS NO MOVEMENT TOWARDS A CERTAIN OBJECT. | |

Figure 4B

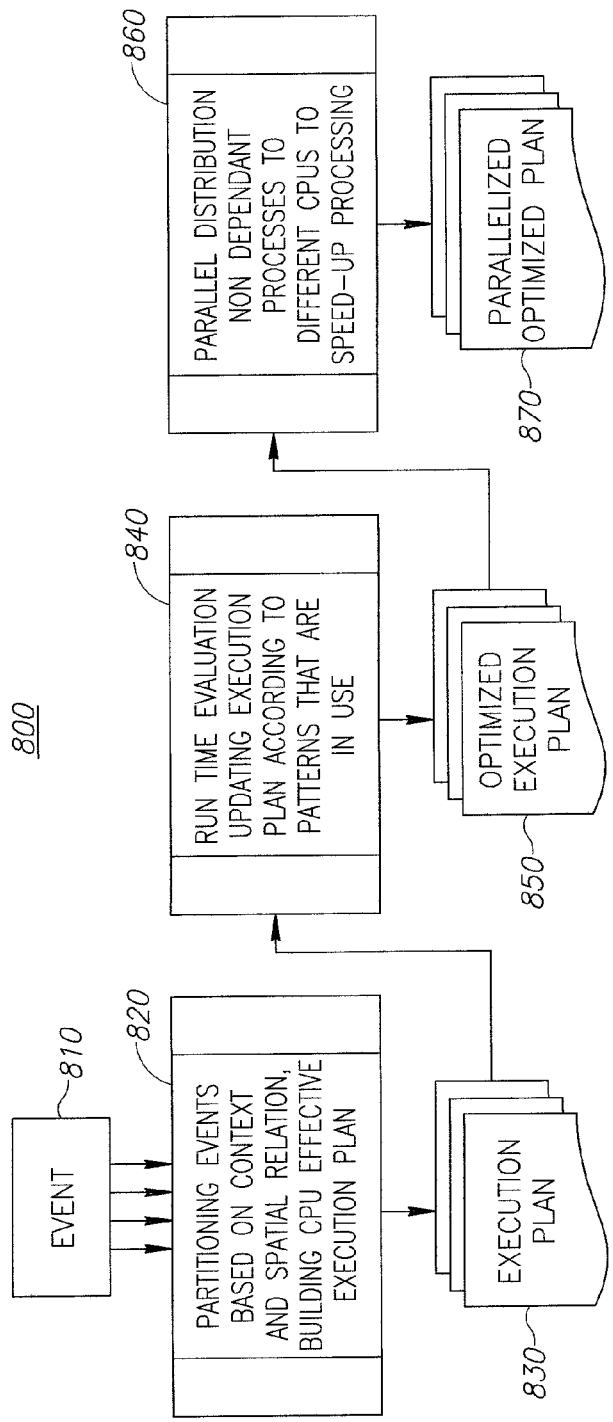
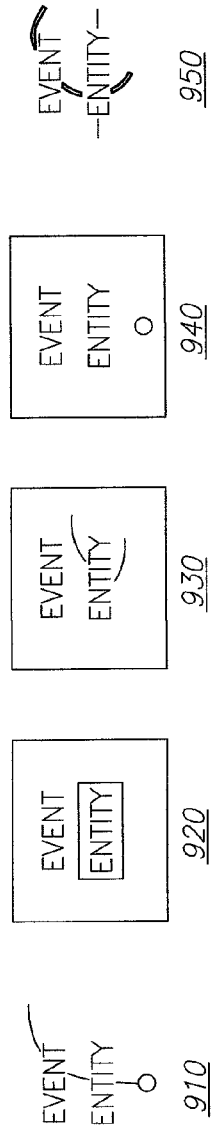
Figure 8
Figure 9

RUNTIME OPTIMIZATION OF SPATIOTEMPORAL EVENTS PROCESSING

BACKGROUND

1. Technical Field

The present invention relates to data processing and more particularly, to event processing of both spatial and temporal events.

2. Discussion of the Related Art

The processing of geo-spatial events becomes more and more important in constructing enterprise applications that can immediately react to business critical events. Geo-spatial event processing is useful, for example, when location-based aspects of events are important for business decisions and operations.

Currently available data processing systems configured to process spatial data, for example GIS systems, operate with static queries on relational databases without any event processing capabilities. In addition, other available existing event processing systems may detect patterns on events. However, these systems lack embedded spatial processing capabilities therefore they process spatial events using "hard coded" solutions for each specific instance, without defining any common used patterns.

BRIEF SUMMARY

One aspect of the invention provides a method of optimizing runtime spatiotemporal events processing. The method includes the following stages: defining a plurality of spatial contexts or spatiotemporal contexts; specifying a plurality of spatial patterns or spatiotemporal patterns being relationships between events complying with specified policies within the defined spatial contexts and spatiotemporal contexts respectively; identifying events of specified properties out of a stream of incoming events, based on the defined spatial contexts or the defined spatiotemporal contexts; detecting event patterns of specified properties out of the stream of incoming events by grouping the incoming events and applying pattern matching processes based on the specified spatial patterns or spatiotemporal patterns; adaptively generating a spatial evaluation plan that defines an order of processing such that event processing is optimized, based on off-line and runtime data; and processing the incoming events based on the order defined in the spatial evaluation plan.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 4A and 4B are tables illustrating an aspect according to some embodiments of the invention;

FIG. 8 is a high level flowchart diagram showing an aspect according to some embodiments of the invention; and FIG. 9 is a block diagram showing relationships according to some embodiments of the invention.

Figure 1:
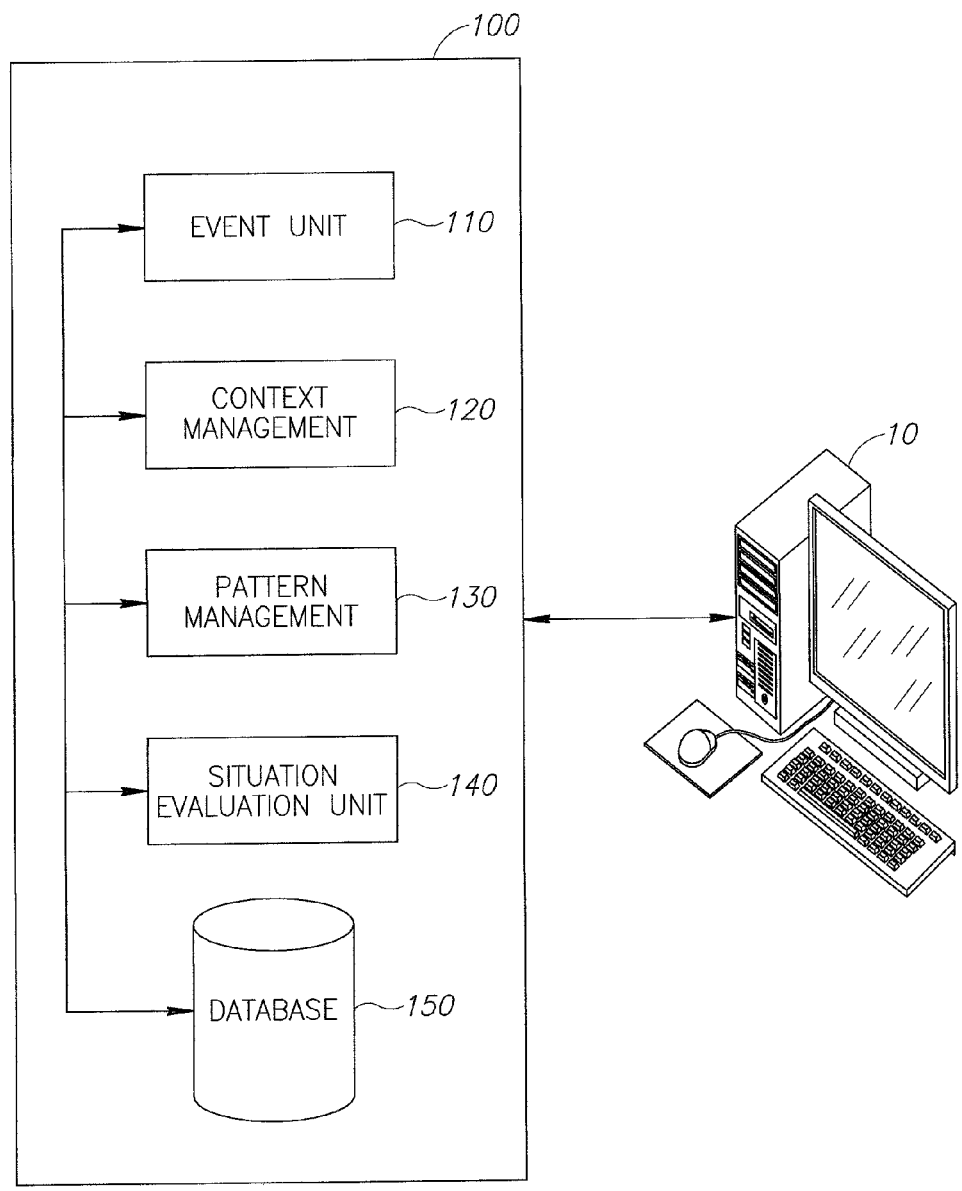
FIG. 1 is a high level schematic block diagram illustrating the system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "EP" or event processing as used herein in this application refers to processing multiple events happening across all the layers of an organization, deriving events as function of the processed events to detect significant situations within the event cloud, analyzing their impact, and taking subsequent action in real time. The events may be time-dependent (temporal) space-dependent (spatial) or a combination thereof (spatiotemporal).

The term "GIS" or geographic information system as used herein in this application refers to any information system that integrates, stores, edits, analyzes, shares, and displays geographic information. In a more generic sense, GIS applications are tools that allow users to create interactive queries (user-created searches), analyze spatial information, edit data, maps, and present the results of all these operations.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Embodiments of the present invention overcome the drawbacks of the related art and address the runtime optimization challenge of spatiotemporal event processing. While many optimization methods are available separately for temporal event processing and spatial event processing, using a temporal optimizer for spatial event processing (or vice versa)

undermines the performance of the event processing algorithm. This is due to the different nature of temporal and spatial event processing.

FIG. 1 is a high level schematic block diagram illustrating the system according to some embodiments of the invention. System 100 is in communication with at least one computer 10 or a computer network (not shown). System 100 may include several processing manager modules. System 100 may include: an event unit 110 configured to receive and filter events; context management tool 120 in which spatial, spatiotemporal and semantic context are being defined; pattern management tool 130 in which various spatial and spatiotemporal patterns are defined; situation evaluation unit 140 in which events are evaluated whether they correspond with predefined pattern in the related context; and database engine 150 is coupled with event unit 110 for querying external databases for obtaining auxiliary data, and coupled to situation evaluation unit 140 for persistency control during evaluation process.

Consistent with one embodiments of the invention, there are provided tools and methods for detecting patterns among events that require spatial or spatial-temporal event patterns. The system provides tools for defining the spatial and spatiotemporal environment where situation can be evaluated or pattern can be applied. This environment is manifested within the concepts of spatial context and spatiotemporal context.

Embodiments of the invention provide a method and system for defining spatial abstractions, and execute them using optimizations that will enable to make it on-line and as part of an event processing system. The input events are grouped for further situation evaluation, in addition this proposed system defines multidimensional context composed of several single dimension contexts. For example, segmentation and temporal contexts or spatial and temporal contexts.

Advantageously, system 100 enables the definition and efficient detection of spatial and spatiotemporal patterns among events to be defined and detected simply and flexibly. It also allows multiple, interrelated contexts to run concurrently, with predefined relations between the contexts.

Figure 2:
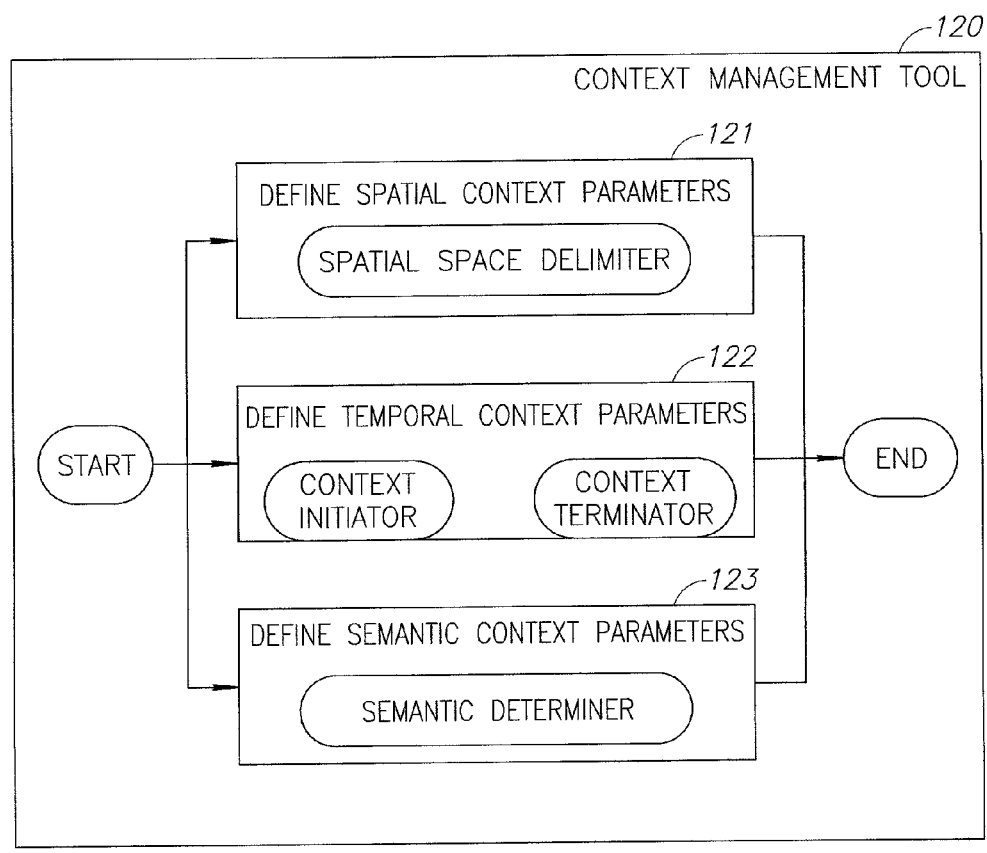
FIG. 2 is a high level schematic block diagram illustrating an aspect according to some embodiments of the invention.

FIG. 2 is a high level schematic block diagram illustrating an aspect according to some embodiments of the invention. Context management tool 120 is shown here in detail. Context management tool 120 is configured to enable a user to define spatial, temporal and semantic contexts using initiators and terminators for each one of contexts. This way multidimensional context environment is established and where situation can be evaluated or pattern can be applied. More specifically, the defining of the context may take any of the following three options: One is to define the spatial context parameters module 121. This may be implemented by a spatial space delimiter that is configured to enable a user to define a spatial event. Another option is the temporal parameters module 122. This may be implemented by a context initiator and a context terminator configured to enable a user to define the start point and end point of a temporal event. Yet another option is associated with semantic context parameters module 123. This may be implemented by a semantic determiner configured to enable a use to determine the semantic properties of an event.

Figure 3:
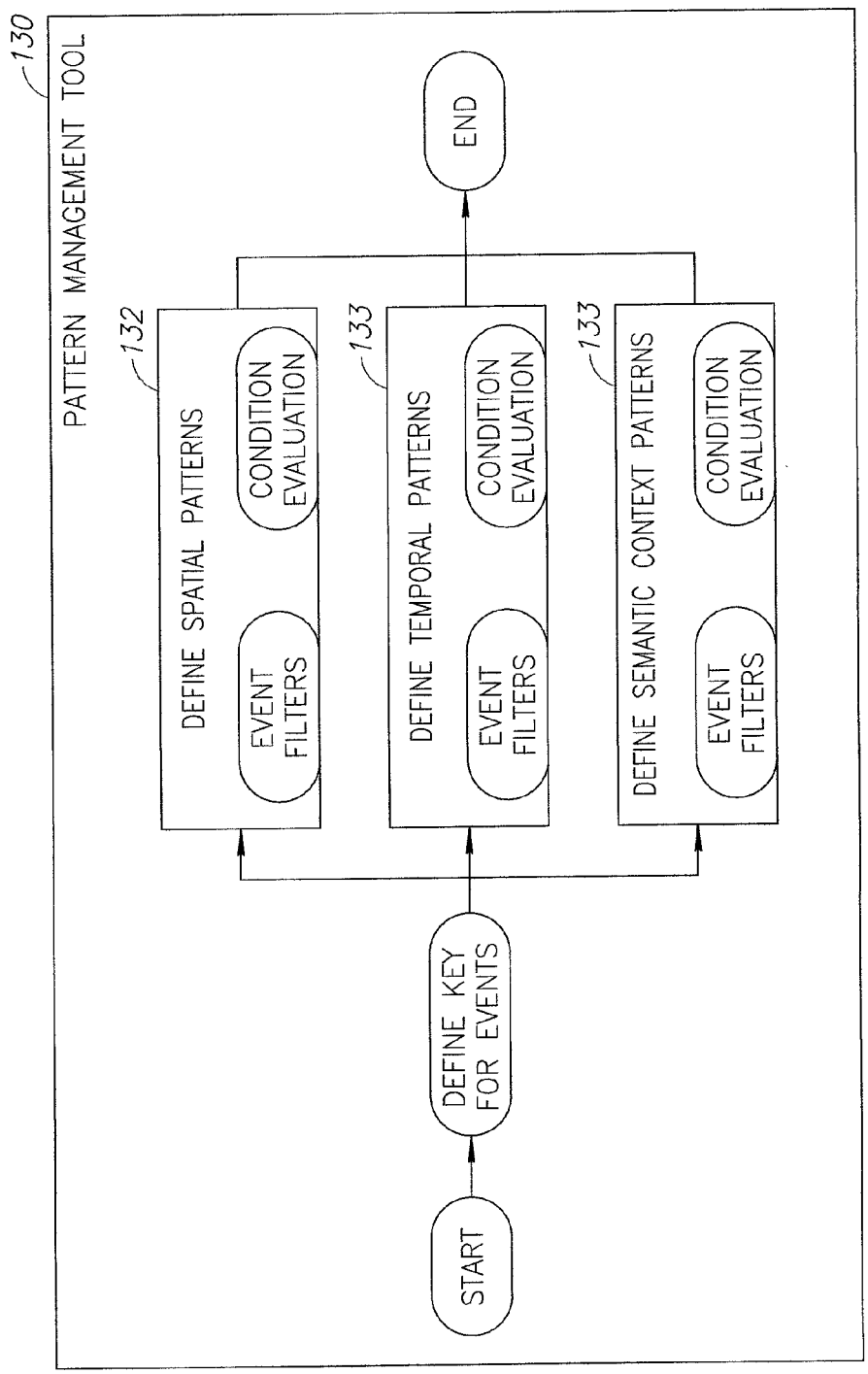
FIG. 3 is a high level schematic block diagram illustrating another aspect according to some embodiments of the invention.

FIG. 3 is a high level schematic block diagram illustrating another aspect according to some embodiments of the invention. Specifically, pattern management tool 130 is shown here in detail. In spatial patterns module 132, temporal patterns module 133, and semantic context patterns module 134, spatial, temporal, spatiotemporal and semantic patterns may be created by a user. This is achieved by defining for each pattern: pattern keys, event types that participate in pattern, event filters and conditions evaluated during the runtime. The user is thus supplied with a specified degree of freedom to set the patterns.

FIGS. 4A and 4B are tables illustrating an aspect according to some embodiments of the invention. Consistent with one embodiment of the invention, in addition to spatial and spatiotemporal context definition for event grouping embodiments of the present invention provide spatial and spatiotemporal patterns which specify the relationship among events complying with polices within the context that is to be detected. These patterns may be described in form of event algebra as situation operators. This is shown, for example in 410 and in 420. In 410 for example, spatial patterns may be defined such as to describe distances between events of a specified set of events. Similarly, in 420, spatiotemporal patterns may be defined, for example, describing two events moving towards each other.

Advantageously, system 100 allows spatial and spatiotemporal event detection, event grouping and condition evaluation using a seamless model and execution system, which allows both high level languages to express both spatial and traditional patterns and does not necessitate using two programming styles for implementing application which has spatial and non-spatial patterns. Also the unified system allows combining optimization geared towards spatial pattern detections with more general event processing optimizations to ensure total efficient implementation.

Further advantageously, system 100 overcomes the alternatives provided by the existing art being are either to use a GIS system and hardcode the event processing part, or to use an event processing system and hardcode the spatial capabilities. The main benefits over these alternatives are—software engineering benefits (unified programming model) and optimization benefit—the ability to use a unified optimization system that takes into consideration—both event processing execution considerations, and spatial related optimization, such as partition of different areas to different processors, using spatial index as part of the indexing mechanism, and optimize the generated code.

Figure 5:
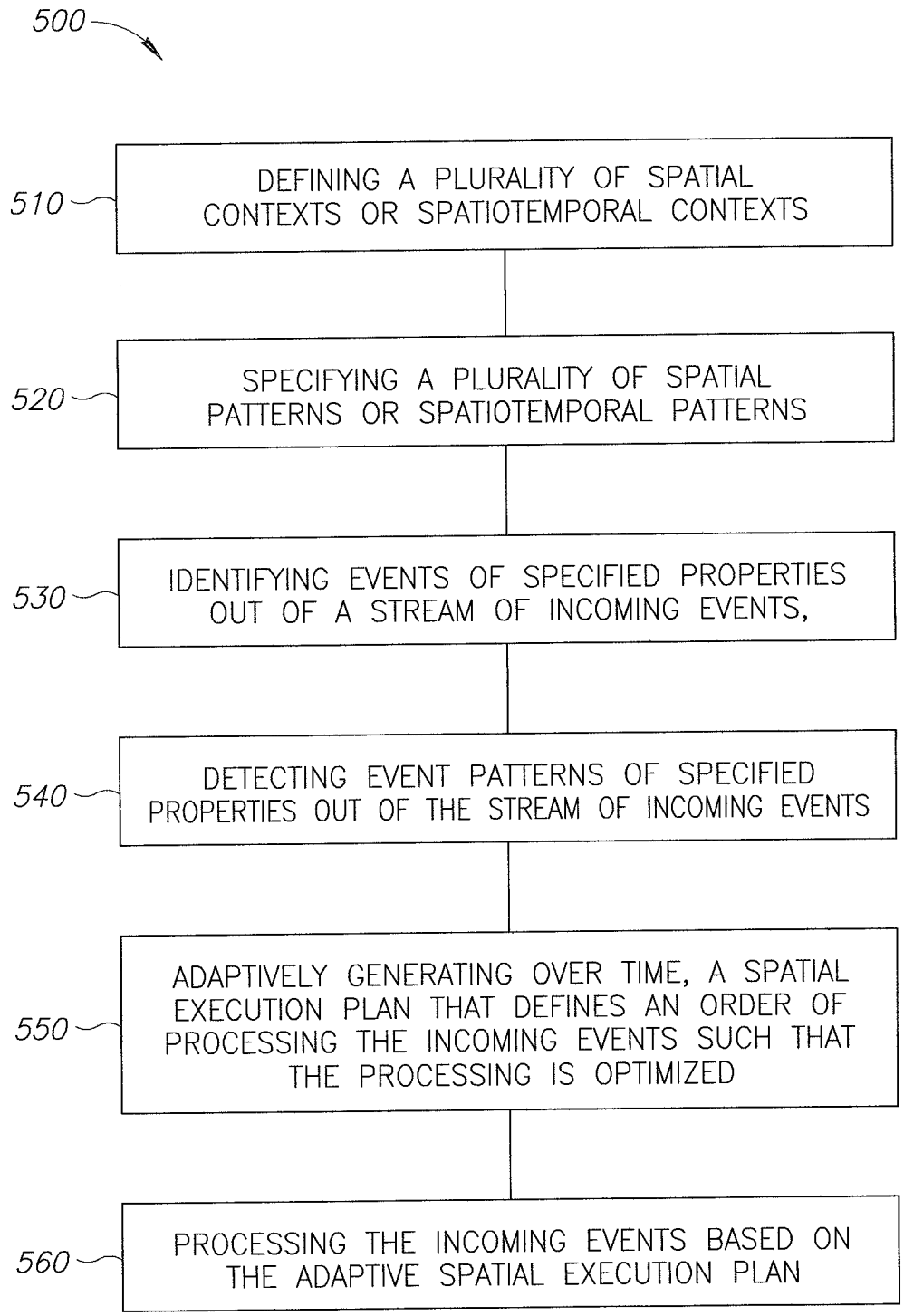
FIG. 5 is a high level flowchart diagram showing a method according to some embodiments of the invention.

FIG. 5 is a high level flowchart diagram showing a method 500 according to some embodiments of the invention. Method 500 is not necessarily implemented by the architecture described above in regards with system 100. Method 500 may include the following stages: defining a plurality of spatial contexts or spatiotemporal contexts 510 and specifying a plurality of spatial patterns or spatiotemporal patterns being relationships between events complying with specified policies within the defined spatial contexts and spatiotemporal contexts respectively 520. The defining and specifying being the aforementioned off-line data. Method 500 further includes retrieving data in runtime in the stages of identifying events of specified properties out of a stream of incoming events, based on the defined spatial contexts or the defined spatiotemporal contexts 530 and detecting event patterns of specified properties out of the stream of incoming events by grouping the incoming events and applying pattern matching processes based on the specified spatial patterns or spatiotemporal patterns 540. Method 500 then goes on to adaptively generate, in accordance with the incoming events, a spatial execution plan that defines an order of processing the incoming events, such that events processing is optimized, based on off-line and runtime data 550. Finally, the incoming events are being processed based on the order defined in the spatial execution plan 560. The spatial execution plan may be created using a spatial optimizer as will be explained below.

As explained above, processing at runtime poses the greatest challenge for spatiotemporal event processing. At run time, spatial events arrive and there is a need to process them based on existing spatial contexts or past instances of spatial events. The spatial event processing is non-trivial since temporal event processing and event processing taken alone are optimized very differently.

Consistent with one embodiment of the invention, efficient caching methods are used to store existing spatial contexts or past instances of spatial events in memory so that newly received event are processed efficiently in view of spatial contexts or past events.

Additionally, there is a need to assist help users to manipulate spatial data for prolonged periods of time by using spatial data structures for online storing spatial events. Retrieving data from specifically tailored spatial data structures, will improve the processing in performance (speed) terms.

Another means for improving the runtime processing is by generating spatial optimizers. The ultimate goal of a spatial optimizer is to produce an evaluation of a given spatial query in the most efficient manner. This evaluation is by a spatial execution plan. A plan is usually constructed by combining several access strategies such as sequential scans, indexed sequential scans, nested loops, and the like. Once a given combination of access strategies is chosen by the optimizer, a data structure must be created to represent the plan. Moreover, there must be some mechanism by which the actions represented by this data structure can be performed.

Figure 6:
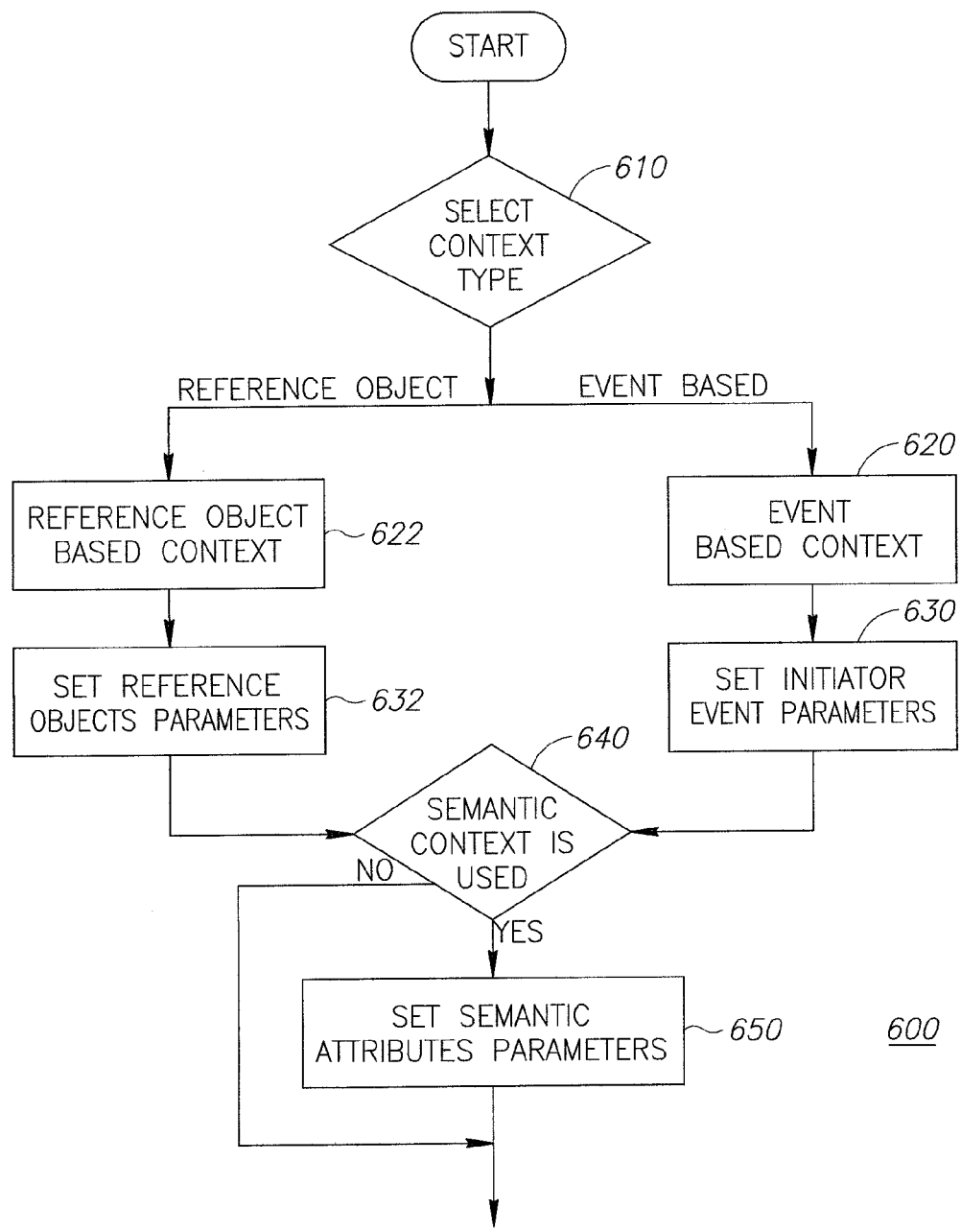
FIG. 6 is a flowchart illustrating aspects of the method according to some embodiments of the invention.
Figure 6:
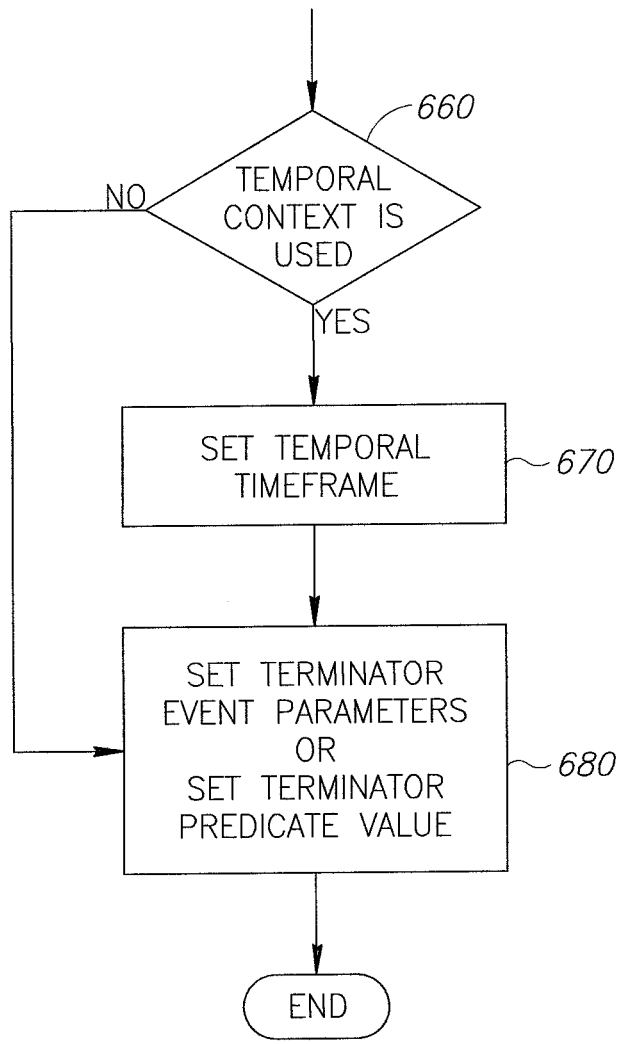

FIG. 6 is a flowchart illustrating aspects of the method according to some embodiments of the invention. In 600, spatiotemporal context definition process is shown. In process 600, context initiators, terminators and what other context are combined with this context thus creating multidimensional context. A context type is selected 610 and the process split into reference object and to event based contexts. In case of reference object type 622 when context initiated by some reference object, respective initiator parameters are set 632. In case of event based context 620, respective initiator parameters are set 630. Semantic context used is checked 640. Semantic attributes parameters are set 650 in case semantic context is used. In case not, temporal context is checked 660. In case it is used, temporal timeframe is set 670. In case not, terminator event parameters or terminator predicate value are set 680.

Figure 7:
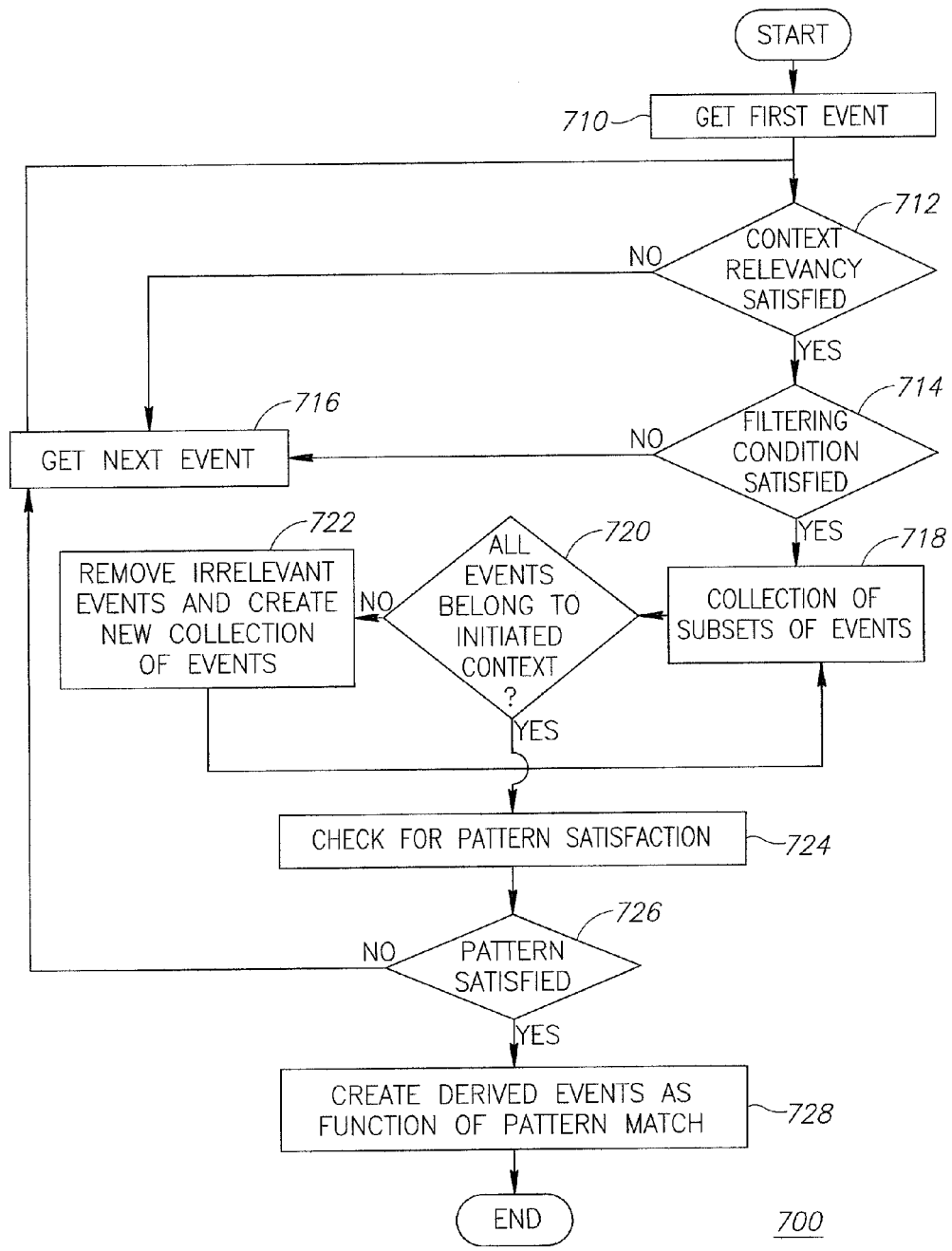
FIG. 7 is a flowchart illustrating aspects of the method according to some embodiments of the invention.

FIG. 7 is a flowchart illustrating aspects of the method according to some embodiments of the invention. Specifically, pattern matching process 700 is shown in detail. Process 700 has three parts: the context part that selects collection of subsets of events that create a pattern of interest, the matching part, in which the relevant event collections are checked for pattern satisfaction; and the derivation part that derives new events as function of the matching part. More specifically, first event is received 710, in case context relevancy is satisfied 712, filtering condition is checked 714. If not satisfied, the next event is fetched 716. If satisfied, collection of subsets of events are at 718, then in case all events belong to initiated context 720 pattern satisfaction is checked 724. In case pattern satisfied 726, derived events as function of pattern match are created 728, and process 700 ends. In case all events do not belong to initiated context, irrelevant events are removed and new collection of events is created 722, then collection of subsets of events are set 718 and so forth.

FIG. 8 is a flowchart showing a spatial optimizer 800 according to some embodiments of the invention. Spatial optimizer 800 may include three stages, including: an event partition 820 based on context; an updating execution plan 840 according to patterns that are in use; and parallel distribution 860 of non-dependant processes to different CPUs.

The first component 820 creates an execution plan 830 based on partitioning events into context defined offline. All spatial objects participating in the process may be classified to one of the three spatial types (area, line and point) and context relation can be also relate to these types; consequently spatial partitioning can be a combination of location types that are valid for each spatial relation. The second component 840 creates optimized execution plan 850 adding run time optimization for patterns in use, because of different object types cross evaluation have different CPU cost we will update out execution plan regarding of CPU cost.

FIG. 9 illustrates the aforementioned variation of relation types representative of the relationship between spatial objects. For example: the relation "contained in" can have five different interpretations depicted in 910-950 based on the object and context types. It should be noted that area to area relation calculation is much more CPU intensive then point to point relation. The second component 840 is used at run time when we use patterns from and, again different spatial types require different types of optimizations.

The third component 860 configured to parallel computing is executed after all participating events are received and execution plan with context and pattern optimization is done. This component adjusts the optimization plan for the use in parallel computing, according to the resource constraints.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A computerized method of runtime optimization of spatiotemporal event processing, comprising:
   receiving and filtering events by filters;
   defining, interactively with a user, a plurality of spatial contexts or spatiotemporal contexts;
   specifying, interactively with the user, a plurality of spatial patterns or spatiotemporal patterns which define relationships among a plurality of events that comply with policies within the defined spatial contexts and spatiotemporal contexts respectively, wherein the specifying is based on the events filters and condition evaluation created interactively with the user;
   detecting, in real time using a computerized processor, a plurality of event patterns within a stream of incoming events by grouping the incoming events into a plurality of subsets and applying a pattern matching process to compare each one of the plurality of subsets to the plurality of specified spatial patterns or spatiotemporal patterns;
   adaptively generating, in real time, a spatial execution plan that defines an order of processing the plurality of events to optimize processing of the plurality of event patterns based at least partially on: the plurality of defined spatial contexts and spatiotemporal contexts defined, the plurality of specified spatial or spatiotemporal patterns, the plurality of subsets, the plurality of detected event patterns, a processing strategy of the plurality of events and an processing intensity of the plurality of events; and
   processing, in real time using the computerized processor, the plurality of event patterns in the order defined by the spatial execution plan to detect at least one significant situation.

2. The method according to claim 1, wherein each one of the spatial contexts is determined based on a spatial space delimiter defined interactively with the user.

3. The method according to claim 1, wherein each one of the spatiotemporal contexts is determined interactively with the user based on a context initiator and a context terminator.

4. The method according to claim 1, further comprising defining semantic context parameters based on a semantic determiner interacting with the user, wherein the semantic context parameters are further used to identify the incoming events and detect the plurality of event patterns.

5. The method according to claim 1, wherein the specifying is based on user selection of situation operators in a form of event algebra.

6. The method according to claim 1, wherein the processing is optimized using at least one spatial data structure tailored specifically to the stream of events based on spatial and temporal characteristics.

7. A system having a processor, for runtime optimization of spatiotemporal event processing, comprising:
   an event unit configured to receive and filter events by filters;
   a context management unit configured to define, interactively with a user, a plurality of spatial contexts or spatiotemporal contexts;
   a pattern management unit configured to specify, interactively with the user, a plurality of spatial patterns or spatiotemporal patterns which define relationships among a plurality of events that comply with policies within the defined spatial contexts and spatiotemporal contexts respectively, wherein the specifying is based on the events filters and condition evaluation created interactively with the user; and
   a situation evaluation unit configured to: detect, in real time, a plurality of event patterns within a stream of incoming events by grouping the incoming events into a plurality of subsets and applying a pattern matching process to compare each one of the plurality of subsets to the plurality of spatial patterns or spatiotemporal patterns;
   adaptively generating, in real time, a spatial execution plan that defines an order of processing the plurality of events to optimize processing of the plurality of event patterns based at least partially on: the plurality of defined spatial contexts and spatiotemporal contexts defined, the plurality of specified spatial or spatiotemporal patterns, the plurality of subsets, the plurality of detected event patterns, a processing strategy of the plurality of events and an processing intensity of the plurality of events; and
   process, in real time, the plurality of event patterns to in the order defined by the spatial execution plan to detect at least one significant situation.

8. The system according to claim 7, wherein the spatial contexts is determined based on a spatial space delimiter defined interactively with the user.

9. The system according to claim 7, wherein each one of the spatiotemporal contexts is determined interactively with the user based on a context initiator and a context terminator.

10. The system according to claim 7, wherein the context management unit is further configured to define semantic context parameters based on a semantic determiner interacting with the user, wherein the semantic context parameters are further used to identify the events and detect the plurality of event patterns.

11. The system according to claim 7, wherein the pattern management unit is further configured to specify the patterns based on user selection of situation operators in a form of event algebra.

12. The system according to claim 7, wherein the situation evaluation unit is further configured to use at least one spatial data structure tailored specifically to the stream of events based on its spatial and temporal characteristics such that processing is optimized.

13. A computer program for runtime optimization of spatiotemporal event processing, the computer program product comprising:
   a non-transitory computer readable storage medium having computer readable program embodied therewith, the computer readable program comprising:
   computer readable program configured to receive and filter events by filters;
   computer readable program configured to define, interactively with a user, a plurality of spatial contexts or spatiotemporal contexts;
   computer readable program configured to specify, interactively with the user, a plurality of spatial patterns or spatiotemporal patterns which define relationships among a plurality of events that comply with policies within the defined spatial contexts and spatiotemporal contexts respectively, wherein the specifying is based on the events filters and condition evaluation created interactively with the user;

computer readable program configured to detect, in real time, a plurality of event patterns within a stream of incoming events by grouping the incoming events in a plurality of subsets and applying a pattern matching process to compare the plurality of subsets to the plurality of spatial patterns or spatiotemporal patterns;

computer readable program configured to generate adaptively in real time, a spatial execution plan that defines an order of processing the plurality of events to optimize processing of the plurality of event patterns based at least partially on: the plurality of defined spatial contexts and spatiotemporal contexts, the plurality of specified spatial or spatiotemporal patterns, the plurality of subsets, the plurality of detected event patterns, a processing strategy of the plurality of events and an processing intensity of the plurality of events; and computer readable program configured to process, in real time, the plurality of event patterns in the order defined by the spatial execution plan to detect at least one significant situation.

14. The computer program product according to claim 13, wherein the spatial contexts is determined based on a spatial space delimiter defined interactively with the user.

15. The computer program product according to claim 13, wherein each one of the spatiotemporal context is determined interactively with the user based on a context initiator and a context terminator.

16. The computer program product according to claim 13, further comprising computer readable program configured to define semantic context parameters based on a semantic determiner interacting with the user, wherein the semantic context parameters are further used to identify the incoming events and detect the plurality of event patterns.

17. The computer program product according to claim 13, further comprising computer readable program configured to specify the patterns based on user selection of situation operators in a form of event algebra.

18. The computer program product according to claim 13, further comprising computer readable program configured to optimize the events processing by using at least one spatial data structure tailored specifically to the stream of events based on its spatial and temporal characteristics.

* * * * *